UNITED STATES PATENT OFFICE 2,622,386

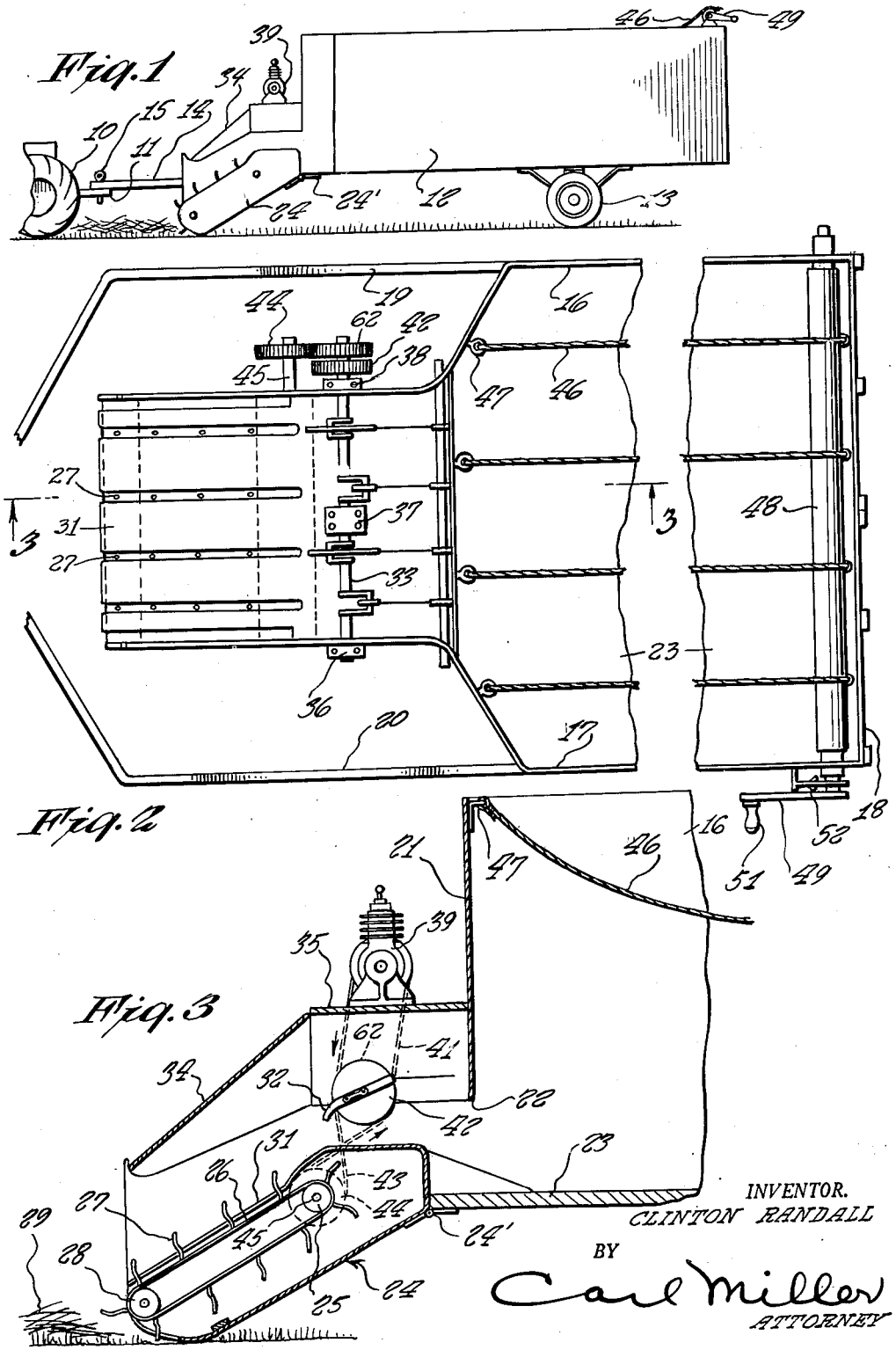

HAY HARVESTER AND LOADING PRESS

Clinton Randall, Lyndonville, Vt.

Application August 25, 1949, Serial No. 112,351

1 Claim. (Cl. 56—350)

This invention relates to a hay harvester and loading press.

It is an object of the present invention to provide a hay harvester and loading press which can be operated by a single man wherein all the hay can be gathered by merely pulling the hay harvester over the ground from a tractor or by horse and the hay will be drawn upwardly by means of a pickup device and flung into the body of the harvester where it may be retained by a simple rope device that can be tightened to retain the hay while the harvester is being drawn to the barn, and wherein the pickup device can be easily and readily elevated at the time the hay is being transported.

Other objects of the present invention are to provide a hay harvester and loading press which is of simple construction, inexpensive to manufacture, easy to operate, compact, easy to attach to the tractor, has a minimum number of parts, has a rope hay press and is efficient in operation.

For other objects and for a better understanding of the invention, reference may be had to the following detailed description taken in connection with the accompanying drawing, in which Fig. 1 is a side elevational view of a hay harvester and loading press embodying the features of the present invention.

Fig. 2 is an enlarged fragmentary top plan view of the harvester with parts removed.

Fig. 3 is a fragmentary sectional view taken on line 3—3 of Fig. 2, the rear end being omitted.

Referring now to the figures, 10 represents a tractor having a hitch bar 11. A hay harvester 12, embodying the features of the present invention, is supported on wheels 13 adjacent the rear of the body and has a tongue 14 which can be attached by a pin 15 to the hitch bar 11 of the tractor. The harvester body comprises sides 16 and 17 and a rear gate 18. The tongue 14 is formed of side members 19 and 20 which converge upon one another to provide for the connection of the same by means of the hitch pin to the hitch bar 11. A front wall 21 extends across the upper part of the body and its lower edge is elevated, as indicated at 22, above floor 23 of the body.

The floor 23 extends forwardly of the wall 21 and has a pickup device 24 hinged as indicated at 24' thereto. This pickup device has a driven pulley 25 over which extends a belt 26 having pickup prongs 27. This pulley belt 26 extends downwardly to the front of the device and passes over an idler pulley 28. These prongs 27 will be advanced to pick up straw or hay 29 and will carry the same upwardly over an apron 31 to tines 32 which are rotated by a crank shaft 33 to cause the hay to be delivered into the harvester body under the edge 22 of the front wall. A shield 34 extends downwardly from a shelf 35 to confine the hay being lifted by the pickup device and to direct it toward the tines 32. The crank shaft is journalled on bearings 36, 37 and 38.

On the shelf 35 is a gasoline engine 39 which is connected by a belt 41 to a pulley 42 on the crank shaft 33. A crossed belt 43 extends from a pulley 62 on the crank shaft to a pulley 44 on the pickup device. This pulley 44 is connected through a shaft 45 with the conveyor pulley 25. Extending throughout the top of the body are a plurality of parallel ropes 46 connected to the front of the body by eyes 47. The rear ends of these ropes are connected to a winch 48 whereby they can be tightened over a load of hay upon turning a crank 49 by its handle 51. The drop gate 18 is such that to permit the hay to be dumped from the floor 23. The pickup device 24 can be elevated when the harvester is transported. A catch 52 holds the winch 48 as the ropes 46 are tightened over the hay.

While various changes may be made in the detail construction, it shall be understood that such changes shall be within the spirit and scope of the present invention as defined by the appended claim.

Having thus set forth and disclosed the nature of my invention, what is claimed is:

A hay harvester comprising a body having front and side walls and a top shelf, a pick up device connected between the side walls, an apron under the pick up device, the pick up device having a driving pulley, a crank shaft journaled between the side walls, said crank shaft having eccentric portions, tines connected respectively to the eccentric portions, the drive pulley means connected to crank shaft and a drive pulley connected between the drive pulley means of the pick up and the drive pulley means of the crank shaft, a power plant mounted on the shelf and power means extending between the power plant and the crank shaft to drive said crank shaft, said pick up device being in turn driven by said crank shaft.

CLINTON RANDALL.

REFERENCES CITED

The following references are of record in the file of this patent:

UNITED STATES PATENTS

| Number | Name | Date |
|---|---|---|
| 172,017 | Hall | Jan. 11, 1876 |
| 1,891,748 | Clove | Dec. 20, 1932 |